United States Patent

[11] 3,604,188

| | | |
|---|---|---|
| [72] | Inventor | Carl W. Mott<br>Lake Ozark, Mo. |
| [21] | Appl. No. | 872,935 |
| [22] | Filed | Oct. 31, 1969 |
| [45] | Patented | Sept. 14, 1971 |
| [73] | Assignee | Mott Corporation<br>La Grange, Ill. |

[54] CUTTING BLADE ATTACHMENT FOR A MOWER
21 Claims, 26 Drawing Figs.

[52] U.S. Cl. .................................................. 56/294,
56/26
[51] Int. Cl. ...................................................... A01d 55/22
[50] Field of Search ........................................... 56/294, 29,
289, 26, 504

[56] References Cited
UNITED STATES PATENTS

| 2,711,067 | 6/1955 | Mott | 56/289 |
| 2,871,644 | 2/1959 | Mott | 56/26 |
| 3,043,080 | 7/1962 | Mott | 56/294 |
| 3,177,640 | 4/1965 | Mott, Jr. | 56/294 |
| 3,309,854 | 3/1967 | Mitchell et al. | 56/294 |
| 3,423,920 | 1/1969 | Woodring et al. | 56/294 |

*Primary Examiner* — Russell R. Kinsey
*Attorney* — Hibben, Noyes & Bicknell

ABSTRACT: This disclosure deals with a mower including means for removably attaching cutting blades to a rotatable shaft of the mower. The mower includes a generally horizontal rotatable shaft, means for rotating the shaft at a high speed, a plurality of cutting blade supports secured to the shaft, and one or more cutting blades attached to each of the blade supports. The supports are angularly and circumferentially spaced along the length of the shaft so that, upon rotation of the shaft, the blades cut a swath which is substantially continuous over the length of the shaft. Each blade support includes a member which is supported at one end only, a generally circular central portion which carries the blades during mower operation, and a free end portion which includes an offset or protrusion, thus forming an out-of-round cross section. Each blade has a hole formed therein, which is shaped to permit the blade to be slipped over the protrusion of the free end portion when the blade is placed at a certain angle relative to the free end portion. Once past the free end portion, the blade is moved to the central portion of the member, and its swings loosely on the central portion. The protrusion of the free end portion then retards accidental removal of the blade from the member.

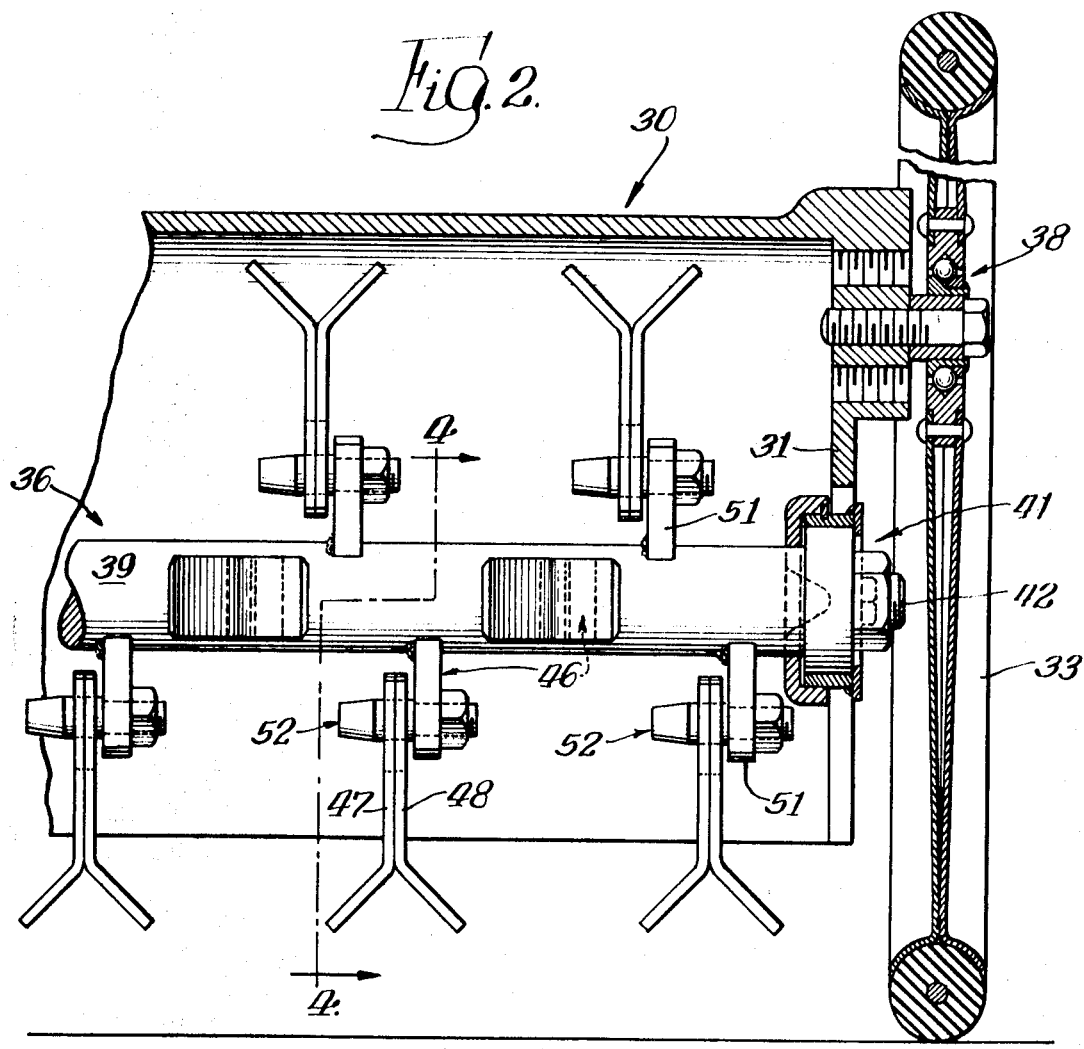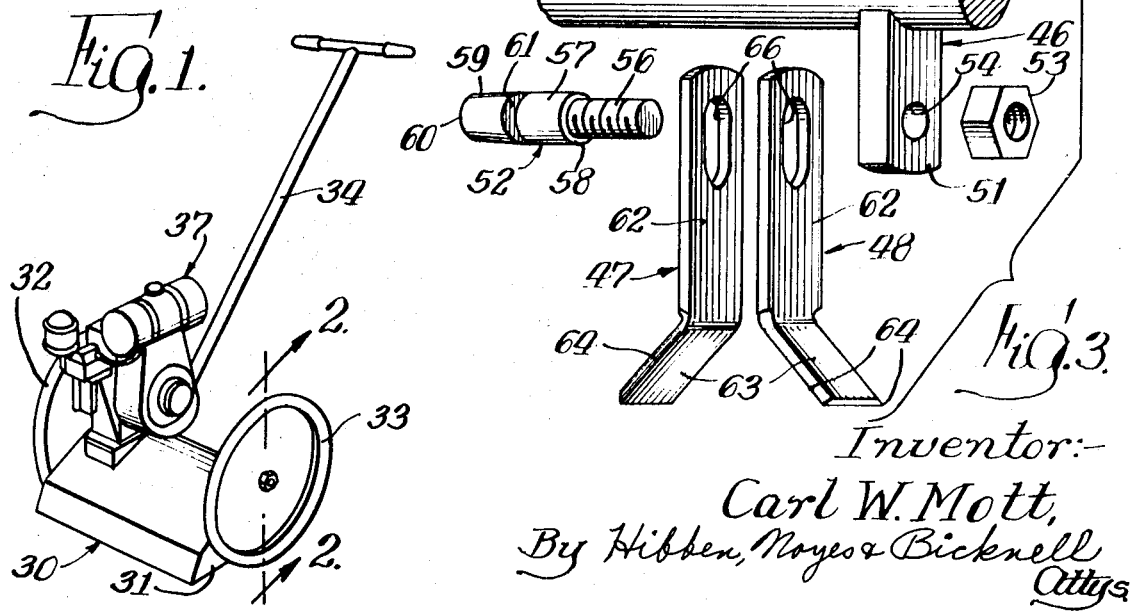

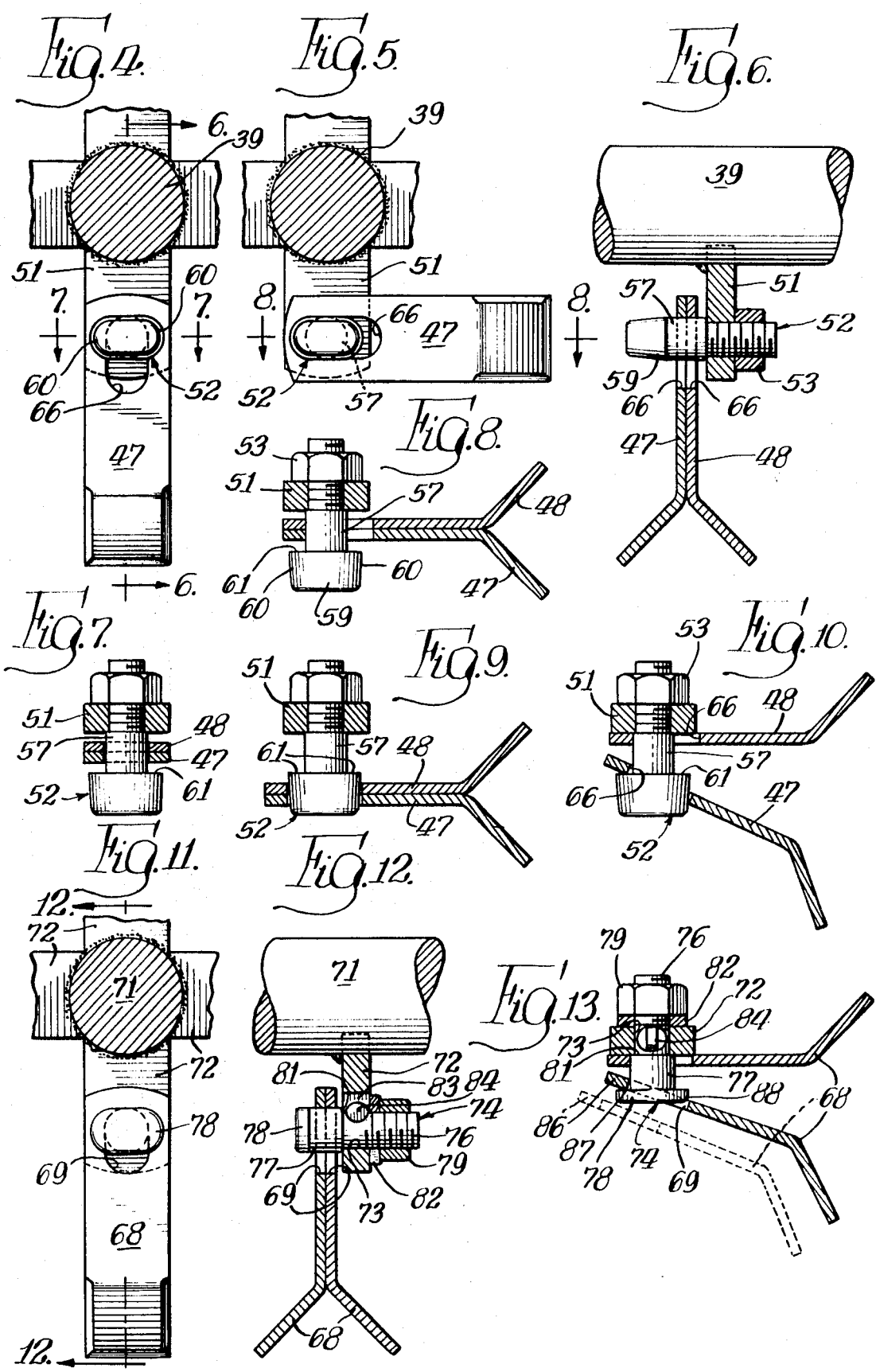

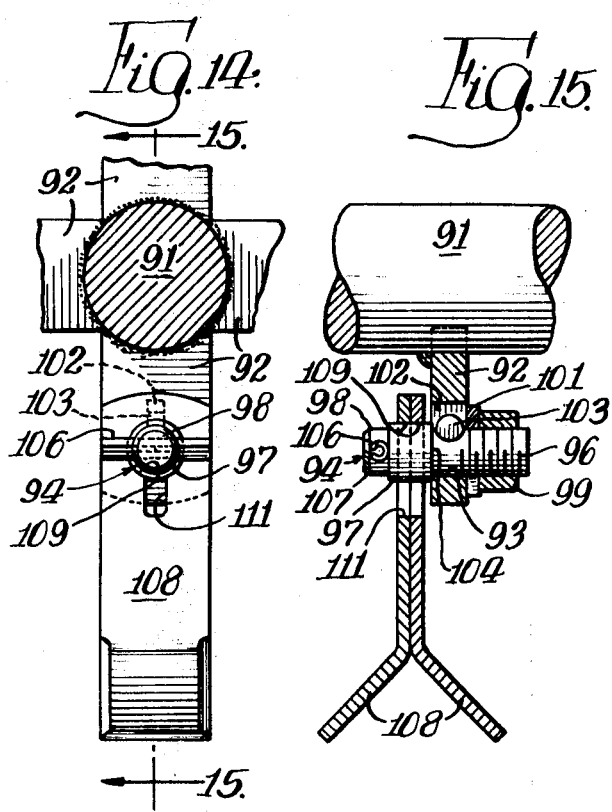
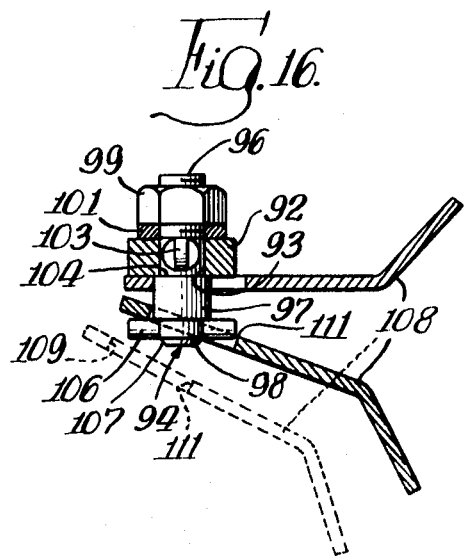
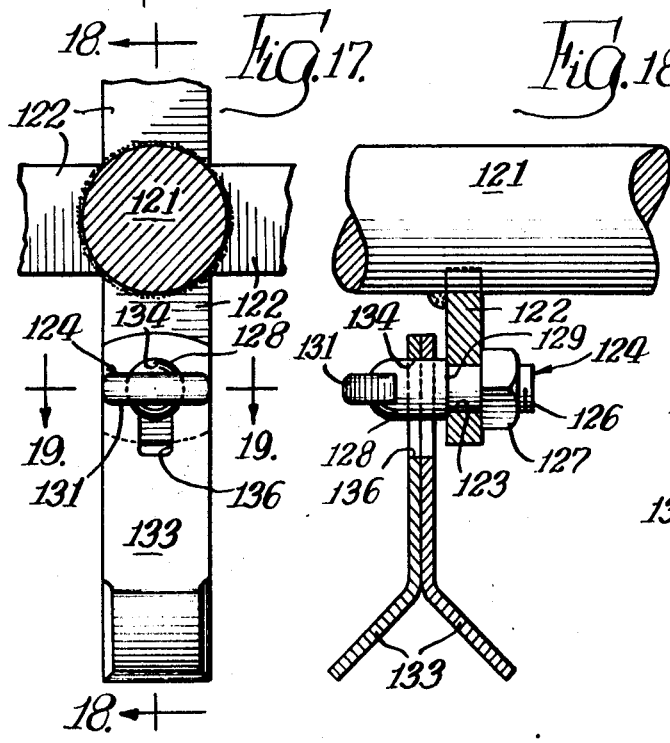
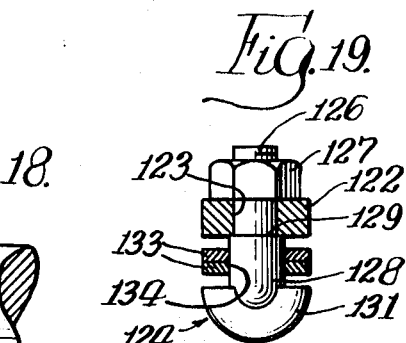
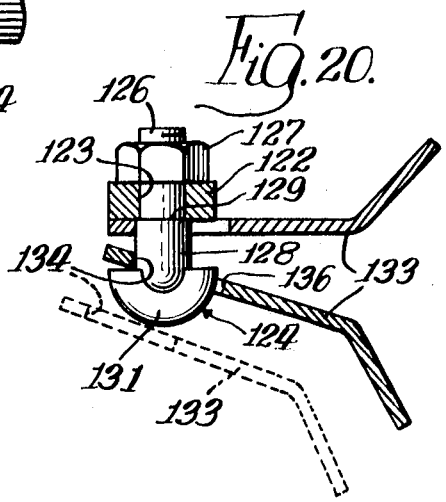

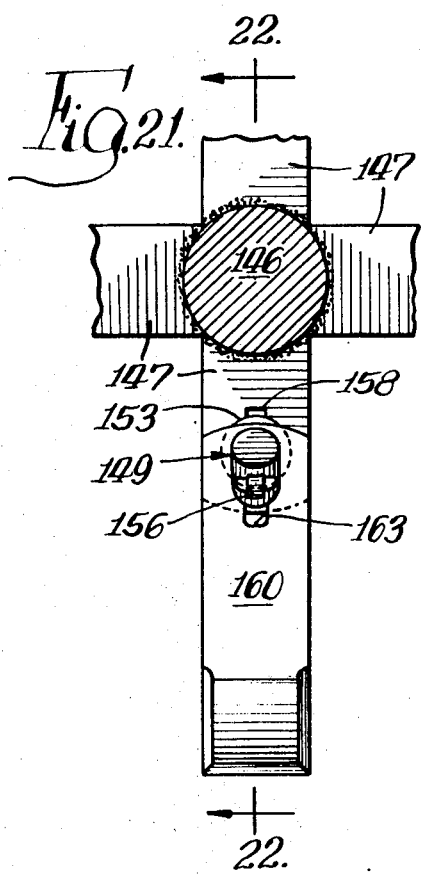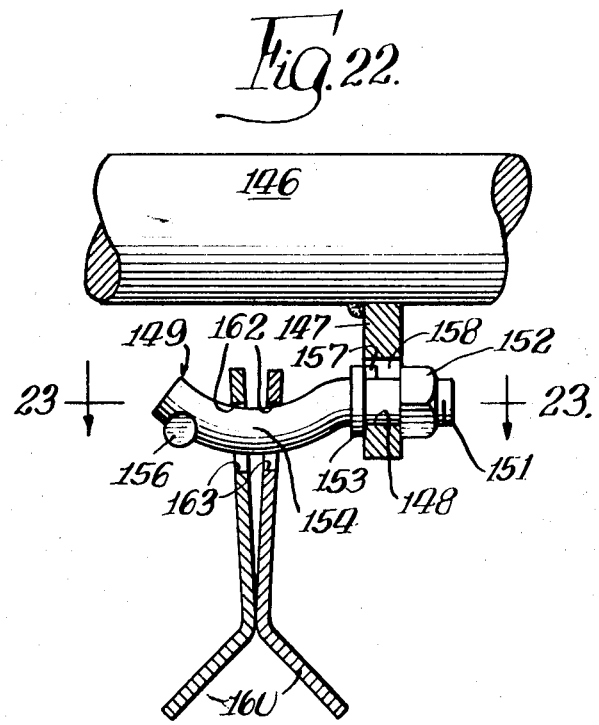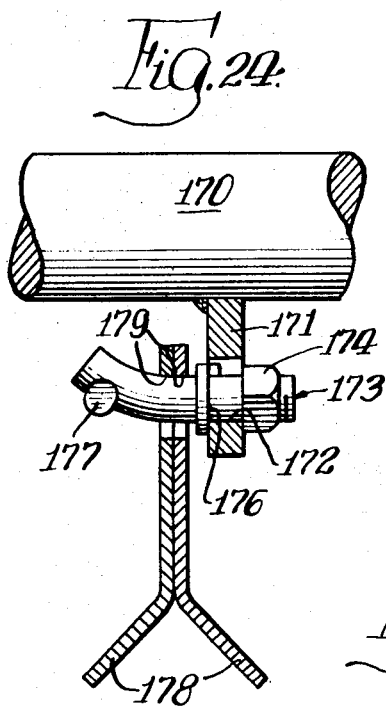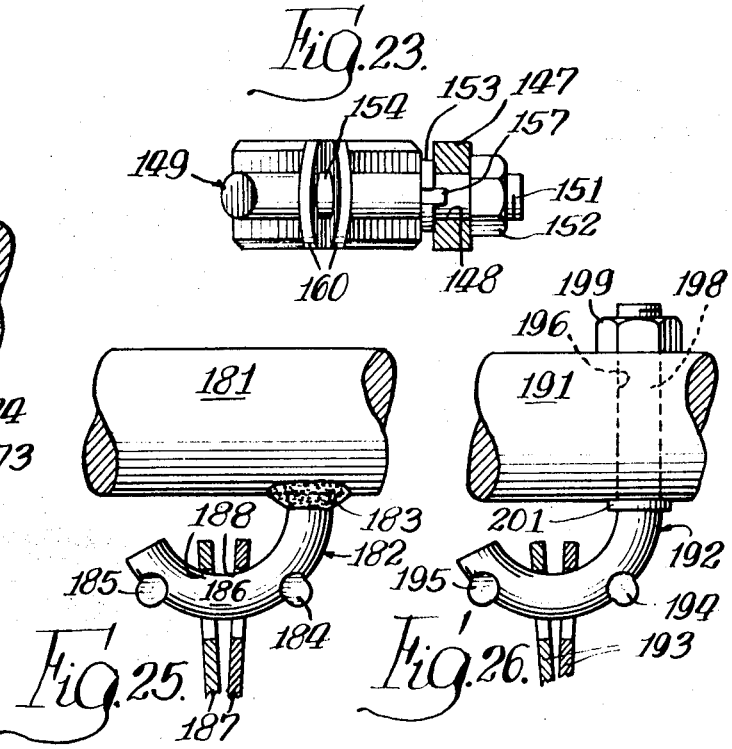

3,604,188

1

CUTTING BLADE ATTACHMENT FOR A MOWER

A mower of the character disclosed, for example in C. W. Mott U.S. Pats. No. 2,871,644 and No. 3,043,080, includes a rotatably mounted generally horizontal shaft, an engine for rotating the shaft at a high speed, a plurality of blade supports located at axially and circumferentially spaced locations on the shaft, and at least one cutting blade pivotally attached to each support. The supports are located on the shaft sufficiently close that, upon rotation of the shaft, the blades cut a substantially continuous swath over nearly the entire length of the shaft.

The blade supports shown in the above patents consists of pairs of ears or lugs which are secured to the shaft and extend generally radially outwardly therefrom. A hole is formed adjacent the outer end of each ear and one or more blades is attached to each pair of ears using a pin or bolt which extends through the holes in the ears and a hole in the blade. When a bolt is used, a washer and nut are also necessary, and when a pin is provided, a cotter pin is required.

While the foregoing blade attaching means works well, it has a disadvantage in that assembly of the blades with the shaft or disassembly from the shaft is a relatively difficult and time consuming operation. Such assembly or disassembly is required fairly frequently because the blades must be periodically sharpened, or replaced because of damage and sometimes the blades have to be replaced by other blades of a different size or shape.

In accordance with the present invention the foregoing problem of difficult and time consuming replacement of the blades is eliminated by providing a mower including quickly attachable and detachable blades. The mower includes a rotatable, generally horizontal shaft having blade attaching means secured thereto, each of the blade attaching means comprising an elongated member which is supported at one end thereof. This member includes a central portion which extends generally parallel to the axis of the shaft and is radically spaced from the outer surface of the shaft, each of said members also including another or free end portion having at least one protrusion formed thereon. One or more blades are attached to said central portion, each of the blades having a hole formed adjacent one end thereof, said hole having a configuration permitting it to be slipped over said protrusion of said end portion by placing the blade in a certain angular position relative to said member.

Objects and advantages of the invention will become apparent from the following detailed description taken in conjunction with the accompanying figures of the drawings, wherein:

FIG. 1 is a perspective view of a mower embodying the present invention;

FIG. 2 is an enlarged fragmentary sectional view taken on the line 2—2 of FIG. 1;

FIG. 3 is a further enlarged fragmentary exploded view of a portion of the structure shown in FIG. 2;

FIG. 4 is a fragmentary sectional view taken on the line 4—4 of FIG. 2;

FIG. 5 is a view similar to FIG. 4 but showing a different position of the parts;

FIG. 6 is a fragmentary sectional view taken on the line 6—6 of FIG. 4;

FIG. 7 is a fragmentary sectional view taken on the line 7—4 of FIG. 4;

FIG. 8 is a fragmentary sectional view taken on the line 8—8 of FIG. 5;

FIG. 9 and 10 are views similar to FIG. 8 but showing different positions of the parts;

FIG. 11 is a view similar to FIG. 4 but showing an alternate embodiment of the invention;

FIG. 12 is a fragmentary sectional view taken on the line 12—12 of FIG. 11;

FIG. 13 is a view similar to FIG. 10 but showing the embodiment of the invention shown in FIG. 11;

FIG. 14 is a view similar to FIG. 4 but showing an alternate embodiment of the invention;

FIG. 15 is a fragmentary sectional view taken on the line 15—15 of FIG. 14;

FIG. 16 is a view similar to FIG. 10, but showing the embodiment of the invention shown in FIG. 14;

FIGS. 17 through 20 are respectively similar to FIGS. 4, 6, 7 and 10 but showing still another alternate embodiment of the invention;

FIG. 21 is a view similar to FIG. 4 but showing still another alternate embodiment of the invention;

FIG. 22 is a fragmentary sectional view taken on the line 22—22 of FIG. 21;

FIG. 23 is a fragmentary sectional view taken on the line 23—23 of FIG. 22;

FIG. 24 is a view similar to FIG. 6 but showing still another alternate embodiment of the invention;

FIG. 25 is a view similar to FIG. 6 but showing still another alternate embodiment of the invention; and FIG. 26 is a view similar to FIG. 6 but showing still another alternate embodiment of the invention.

With reference to FIGS. 1 and 2, a mower having blades attaching means embodying the invention comprises a hoodlike frame 30 having side sections 31 (FIG. 2) and an open bottom, a pair of wheels 32 and 33 rotatably fastened to the side sections 31 of the hood 30 for supporting the frame 30 above the ground, a handle 34 fastened to the frame 30 for moving the mower on the ground, a cutting assembly 36 located within the hood of the frame 30 and rotatably supported on the side sections 31, and an engine 37 mounted on top of the frame 30 for rotating the cutting assembly 36 at high speeds.

With particular reference to FIG. 2, the frame 30 preferably comprises a single piece casting which deflects cuttings downwardly and is capable of protecting an operator of the mower from debris during operation. The wheels 32 and 33 are rotatably fastened to the side sections 31 of the frame 30 by bearing assemblies 38 which may be conventional. The cutting assembly 36 comprises a shaft 39 which is rotatably mounted on the side sections 31 by bearing assemblies 41 which again my be conventional. The shaft 39 of the cutting assembly 36 is preferably an elongated solid metal shaft having reduced diameter end portions 42 which are engaged by the bearing assemblies 41. The end of the shaft 39, which is not shown in FIG. 2 is similar to the end which is shown except that it is connected to be driven by the output shaft of the engine 37.

A plurality of blade supports 46 are provided at axially and circumferentially uniformly spaced locations on the shaft 39, each of the supports 46 carrying at least one cutting blade. In the present instance, two blades 47 and 48 (FIGS. 2 and 3) are attached to each support. In the form of the invention illustrated in FIGS. 2 through 10, each blade support 46 comprises an ear 51, a bolt 52 and a nut 53. The ear 51 is secured as by welding to the shaft 39 and extends generally radially outwardly therefrom. A hole 54 is formed adjacent to the outer end of each ear 51, the hole being sized to receive a threaded end portion 56 of the bolt 52. The portion 56 extends through the hole 54 and receives a nut 53. The nut 53 may be a self-locking type or a lock washer may be used. The center section, indicated at 57, of the bolt 52 is generally circular in cross section and has a diameter which is larger than the threaded portion 56, thus forming a radial shoulder 58 which abuts one side of the ear 51 (FIG. 6) when the nuts 53 is tightened on the bolt 52. Thus, as shown in FIGS. 2 and 6, the bolt 52 is supported at one end only on the ear 51. The free end portion or head 59 of the bolt 52, which is the portion remote from the ear 51, has a shaped which will be described in greater detail hereinafter.

With particular reference to FIGS. 2 and 3, each of the blades 47 and 48 includes a flat elongated portion 62 and a bent cutting portion 63, the opposite edges of the cutting portion 63 being sharpened as at 64. The flat elongated portion 62 has an elongated slot or hole 66 formed therethrough, the width of which is slightly larger than the diameter of the central portion 57, as shown in FIG. 7. In addition to enabling assembly of the parts as will be explained, the elongation of the hole permits the blade to move upwardly when it strikes a solid object during operation. As shown in FIGS. 6 and 8, the length of the central section 57 of the bolt 52 is approximately twice the thickness of a pair of the blades 47 and 48, so that a pair of blades positioned in back-to-back relation hang loosely on the portion 57.

To enable the blades 47 and 48 to be readily attached to or detached from the bolt 52, the head 59 and the slot 66 are provided with the same configuration but the slot 66 is made slightly larger than the head 59. Thus, both the slot 66 and the head 59 are similarly elongated as shown in FIG. 5. The width of the head 59 is substantially equal to the diameter of the central portion 57 of the bolt whereas the portions of the head 59 in the direction of elongation form two protrusions or offsets 60. The juncture of the central portion 57 with the two protrusions forms shoulders 61. Further, the head 59 is preferably tapered slightly as shown in FIGS. 6 to 9, the taper being such that the dimensions of the head 59 gradually decrease toward the outer face of the head.

To assemble the bolts 52 with the ears 51, each bolt 52 is positioned such that the direction of elongation of the head 59 extends generally perpendicular to the radius of the shaft 39. The two blades 47 and 48 for each blade support are then positioned in back-to-back relation, and the direction of elongation of the holes 66 and the head 59 are aligned. The holes 66 are then slipped over the head 59 while holding the plane of the flat portion 62 of each blade substantially perpendicular to the axis of the bolt 52. The taper of the head 59 assists in the operation of sliding the blades over the head 59. Once the blade have been moved past the shoulder 61, they may be released and permitted to hang from the portion 57 with little danger that they will accidentally fall off the bolt 52. While the mower is in operation, the shaft 39 rotates at a high speed, and all of the blades 47 and 48 are held in generally radially extended positions, as shown in FIG. 2 due to centrifugal force, and in this position of the blades, the protrusions 60 of the bolt 52 prevent the blades from falling off the bolt 52. The blades are not exactly radially extended because they tend to angle back a slight amount due to wind resistance and the resistance of grass during cutting, but the protrusions 60 still prevent the blades from falling off. When the engine 37 is not operating and the shaft 39 is not rotating, the blades hang downwardly from the associated bolts 52 due to gravity, but the possibility is very remote that one of the blades will fall off its associated bolt because, to do so, the blade must be turned to align the slot 66 therein with the head 59 of the bolt, and it must move in the direction of the axis of the bolt while the plane of the flat portion 62 of the blade is perpendicular to the axis of the bolt, and this is very unlikely to happen. The flat portion 62 must be held perpendicular to the bolt because the holes 66 are only slightly larger than the head 59, as shown in FIG. 9, and consequently a different orientation will cause the parts to bind and prevent removal. As shown in FIG. 10, if one of the blades is cocked at an angle while attempting to slide it over the head 59, the axial length of the head 59 is great enough relative to the length of the hole 66 to again bind the parts. Thus, a blade may be readily attached to or detached from a bolt 52 by positioning it at a certain angle relative to the bolt and then sliding it over the head 59 while maintaining this angular orientation. Nevertheless, there is little danger that a blade will accidentally come off a bolt because it is highly unlikely that the required orientation and movement will occur accidentally.

When an assembly embodying the invention is sued in a side mounted mower which is tilted upwardly on one end when not in use, the bolts should be mounted such that their free ends or heads extend upwardly when the mower is tilted to decrease the chance that the blades will fall off.

The embodiment of the invention illustrated in FIGS. 11 to 13 includes a shaft 71 having a plurality of radially extending ears 72 secured thereto as by welding. Each ear 72 has a hole 73 formed therethrough, and a bolt 74 is secured to each ear 72. Each bolt includes a threaded portion 76 which extends through the hole 73, a central or shank portion 77, and a free end portion or head 78. A nut 79 and a shoulder 81 on the bolt 74 clamp the ear 72 between them, and a lock washer 82 binds the nut 79 to the bolt 74. A keyway 83 formed in the ear 72 receives a key 84 formed on the bolt 74 in order to ensure that the bolt 74 will always have a predetermined angular position relative to the ear 72. The key and keyway arrangement is further advantageous in that is simplifies assembly of the bolt 74 with the ear 72. It is only necessary to locate the key in the keyway and tighten the nut 79, using a single wrench because the key prevents the bolt 74 from turning.

Attached to the bolt 74 is a pair of blades 68, each of which is similar to the blades 47 and 48. Each blade 68 has an elongated hole 69 formed therethrough, the direction of elongation being lengthwise of the blade. The width of each hole is slightly greater than the diameter of the central portion 77 of the bolt 74 so the blades may swing loosely from the bolt 74.

As shown in FIG. 11, the head 78 of the bolt is also elongated, and, in this instance, the length of each hole 6 is slightly less than the corresponding dimension of the head 78. The width of each hole is, however, slightly wider than the e width of the head 78. While the configuration of the head 78 is generally the same as that of the head 59, the axial length of the head 78 is considerably less than that of the head 59. As shown in FIG. 11, the head 78 is formed relative to the key 84 such that the direction of elongation of the head is substantially perpendicular to a radial line of the shaft 71.

Since the elongation of the head 78 is greater than that of the hole 69 of each blade, a blade cannot be slipped straight on or off the bolt even though the blade is turned to align the directions of elongation of the head 78 and the hole 69. With reference to FIG. 13, a blade 68 can be attached to the bolt 74 only by firs tilting or cocking the blade relative to the bolt 74 to the position indicated in dashed lines in FIG. 13, and then hooking one end 86 of the blade on one end of the head 78, as shown in full lines in FIG. 13. When the hooked end of the blade is pulled tightly against the bolt at the point 87 where the central section 77 joins the head 78, the length of the hole 69 is just long enough relative to the dimensions of the head 78 to permit the blade to be swung counterclockwise as seen in FIG. 13, with the head passing through the hole. Thus, the length of the hole 69 must be slightly greater than the distance from the point 87 to the outer corner 88 at the other end of the head 78. This distance is of course determined both by the amount of elongation of the head 78 and by its axial length. It will be apparent that the axial length of the central portion 77 must be great enough to provide clearance for the end 86 of a blade when a blade is tilted and another blade is already on the central portion 77.

The form of the invention illustrated in FIGS. 14 through 16 also includes a shaft 91 which is similar to the shaft 39, and a plurality of blade supports each including a radially extending ear 92 which is similar to an ear 51. Again, the ears 92 may be secured to the shaft 91 as by welding, and each ear 92 has a hole 93 formed therethrough adjacent to its outer end. Each blade support, in addition to ear 92, further includes a bolt 94 including a threaded end portion 96, a generally circular central portion 97 and a head or free end portion 98. The hole 93 in each ear 92 is sized to receive the threaded portion of the bolt 94, and a nut 99 is threaded on the portion 96. A shoulder 104 on the bolt 94 acts as a stop on the opposite side of the ear so that the bolt may be secured to the ear. A lock washer 101 may be provided to bind the nut 99 to the bolt 96.

In addition, as shown in FIG. 15, a keyway or slot 102 may be formed in the ear 92 at one side of the hole 93, and a key 103, formed on the bolt 94 as by pinching a side of the bolt, is located in the keyway 102, thus holding the bolt 94 in a fixed angular position relative to the ear 92. The use of such a key and mating slot is advantageous for two reasons. First of all, it ensures that the bolt 94 will have a certain angular position relative to the ear 92, and secondly, it permits assembly of the bolt 94 with the ear 92 using only one wrench. It is only necessary for the assembler to position the bolt 94 with the key 103 in the slot 102 and then tighten the nut on the bolt because the key 103 prevents the bolt 94 from turning as the nut 99 is being turned. While such a key and slot arrangement is not shown in connection with all of the forms of the invention, it should be understood that this arrangement may be used with most of the forms.

The central portion 97 of the bolt 94 has a diameter which is slightly greater than that of the threaded portion 96 and of the diameter of the hole 93, thus forming the shoulder or abutment 104 which bears against the ear 92 when the nut 99 is tightened.

In the form of the invention illustrated in FIGS. 14 to 16, protrusions at the head or free end portion 98 are formed by a pin 106 which is pressfitted in a radially extending hole formed in the head 98 of the bolt 94. The hole for the pin 106 is preferably located relative to the key 103 such that the pin 106 is substantially perpendicular to a radial line from the shaft 91. With particular reference to FIG. 16, the diameter of the head 98 is reduced relative to the diameter of the central portion 97, and the corner of the end of the head is beveled as indicated at 107 (FIG. 15). The pin 86 extends to the outer end of the central portion 77 and projects in opposite radial directions from the bolt, thus forming two protrusions.

Two blades 108 are provided which are similar to the blades 47 and 48, the only difference lying in the shape of the holes 109 in the blades 108. The hole 109 for each blade is of keyhole shape and includes a generally circular portion having a diameter slightly greater than the central portion 97 of the bolt, and a radially extending slot or elongation 111, which extends from the circular portion longitudinally of the blade toward the cutting end thereof. Thus, during operation of the mower, the two blades 108 will extend generally radially outwardly from the shaft 91 due to centrifugal force, and the slots 111 will be substantially perpendicular to the pin 106, as shown in FIG. 14.

To assemble the blade holder and the blades on the shaft, the threaded portion 96 of the bolt 94 is placed in the hole with the key 103 in the slot 102, and the bolt is secured to the ear by the lock washer 101 and the nut 99. The blades 108 are assembled on the bolt 96 similar to the manner in which the blades 68 are assembled on the bolt 74, by cocking or tilting a blade at an angle, as shown in FIG. 16, and hooking the hole 109 of the blade on one end of the pin 106. The blade is then placed at an angle to bring the slot 111 into alignment with the other end of the pin 106, and the slot 111 is long enough to permit the other end of the pin to pass therethrough as the blade is moved to a perpendicular position relative to the bolt 94. Thereafter, the blade may be removed or disassembled from the blade holder only by reversing the above procedure.

The construction of the embodiment of the invention illustrated in FIGS. 17 to 20 is generally similar to that of the forms illustrated in FIGS. 11 to 16. The form illustrated in FIGS. 17 to 20 includes a shaft 121 having radially extending ears 122 secured thereto as by welding, each ear 122 having a hole 123 formed therethrough adjacent its outer end. The shaft 121, the ears 122 and the holes 123 are of course generally similar to the corresponding elements of the above forms of the invention. A bolt 124 is provided, including a threaded end portion 126 which extends through the hole 123 and receives a nut 127. The bolt 124 further includes a central or shank portion 128 which has a diameter slightly greater than that of the threaded portion 126, thus forming a shoulder 129 which bears against the ear 122 when the nut 127 is tightened. As in the previously described forms of the invention, the bolt 124 is thus supported at one end on the ear 122.

At the head or free end portion of the bolt 124 are provided two protrusions or offsets formed by a flat semicircular head 131. The head 131 may be formed, for example, by welding a member to this end of the bolt, the member being semicircular and having flat sides. As is shown in FIGS. 19 and 20, the ends of the straight edge of the head extend radially in opposite directions from the central portion 128 and form the two previously mentioned protrusions.

Supported on the central portions 128 of the bolt 124 is a pair of blades 133, each of the blades having a keyhole-shaped hole 134 formed therein, similar in shaped to the hole 109 formed in each blade 108 (FIG. 15). Thus, each hole 134 has a generally circular area and an elongation 136 which extends from the circular area toward the cutting end of the blade. The central area of each hole 134 has a diameter which is slightly larger than that of the central portion 128 of the bolt 124 so that the blades may swing loosely on the bolt. The length and width of the elongation 136 of each hole are also slightly greater than that of a protrusion formed by the head 121.

The blades 133 are attached to the bolt 124 similarly to the form shown in FIGS. 11 to 13. A blade may be detached from the bolt by reversing this procedure. The bolt 124 is preferably located such that the plane of the head 131 is generally perpendicular to a radial line of the shaft 121, so that the protrusions formed by the head 131 will be generally perpendicular to the elongation 136. Such orientation of the parts reduces the chance that a blade will become accidentally detached from the bolt.

The embodiment of the invention illustrated in FIGS. 21 through 23 includes a shaft 146 and a plurality of radially extending ears 147 secured to the shaft 146 in spaced relation similar to the previously described embodiment. Each ear 147 has a hole 148 formed therein adjacent its outer end, and each hole 148 receives a bolt or pin 149. The bolt 149 has a threaded end 151 which is positioned in the opening 148 of the associated ear 147, and a nut 152 is provided to secure the bolt 149 to the ear 147. An enlargement 153 forming a shoulder is provided on the bolt 149 on the side of the ear 147 which is away from the nut 152, the nut 152 pulling the enlargement 153 tightly against the ear 147 in order to secure the bolt 149 to the ear 147. The bolt 149 is preferably provided with a key 157 which fits in a keyway or slot 158 of the hole 148 in order to hold the bolt 149 in a predetermined position relative to the ear 147.

The central portion 154 of the bolt 149 extends generally parallel to the shaft 146 and is curved or bowed away from the shaft 146, as shown in FIG. 22. The free end portion of the bolt 149 is provided with a protrusion or offset 156 on its side which is away from the shaft 146. The protrusion 156 may be formed as by a pinching operation wherein a portion of the bolt 149 is pinched outwardly to form the protrusion.

Supported by the bolt 149 is a pair of blades 160 which are generally similar to the blades previously described. Each blade has a hole 162 formed in one end portion, the hole 162 having a circular main portion and a slot or elongation 163 to form a keyhole-shaped opening. The width and height of the slot 163 is slightly greater than that of the protrusion 156. To assemble the blades 160 on the bolt 149, the blades are simply positioned with the holes 162 over the free end of the bolt and the slots aligned with the protrusion 156, and the blade is then slipped past the protrusion 156 while holding the blade generally perpendicular to the bolt. The blades 160 are normally maintained by centrifugal force during operation of the mower at the bottom of the bow of the bolt 149. It will be noted that the protrusion 156 is formed a short distance from the end of the bolt 149, and the extended end of the bolt reduces the chance that a blade 160 will accidentally become detached from the bolt 149 because the plane of the flat portion of the blade must be held substantially perpendicular to the bolt 149 as the blade is moved off the bolt 149.

With reference to FIG. 24, this embodiment of the invention also includes a shaft 170, at least one radially extending ear 171 secured to the shaft 170 as by welding, the ear 171 having a keyhole-shaped opening 172 formed adjacent its outer end. A bolt 173 is positioned in the hole 172, this bolt 173 having a threaded end portion which receives a nut 174 in order to secure the bolt 173 to the ear 171. Again, an enlargement forming shoulder 176 is provided on the bolt 173, which serves as a stop when the nut 174 is tightened on the bolt 173.

The bolt 173 has a configuration generally similar to the bolt 149, the principal difference being that the bolt 173 sweeps or curves from the hole 172 toward the shaft 170 in a gradual curve, rather than being bowed as in the form of the invention illustrated in FIGS. 21 to 23. Adjacent the free end of the bolt 173 is formed a protrusion 177 which is formed and located similarly to the protrusion 156. Attached to the bolt 164 is a pair of blades 178 which may be identical with the blades 160. Each of the blades 178 has a keyhole-shaped opening 179 formed adjacent one end portion thereof, the slot of the opening 179 fitting over the protrusion 177 on the bolt when the blades 178 are moved on or off the bolt 173.

The embodiment of the invention shown in FIG. 25 comprises a shaft 181 and a hook-shaped member 182 which has one end thereof welded directly to the shaft 181 as indicated at 183, the remainder of the member 182 curving longitudinally of the shaft 181 through an angle of approximately 150°. Two protrusions 184 and 185 are formed on the side of the member 182, which is away from the shaft 181, the protrusions 184 and 185 being formed as by pinching portions of the members 182 outwardly. The two protrusions are located on opposite sides of the central portion 186 of the member 182, the portion 186 being at the greatest distance from the shaft 181 and extending substantially parallel to the shaft 181. Again, a pair of blades 187 are mounted on the central portion 186 of the member 182, between the two protrusions 184 and 185. Each of the blades 187 has a keyhole-shaped hole 188 formed therein, and the two blades 186 are attached to the member 182 similar to the manner in which the blades 160 and 178 are attached to the respective members.

The embodiment of the invention illustrated in FIG. 26 also includes a shaft 191 and a hook-shaped member 192, the member 192 supporting a pair of blades 193 between a pair of protrusions 194 and 195. This portion of the construction is similar to that shown in FIG. 25. The only difference between the forms shown in FIGS. 25 and 26 is the manner in which the member is secured to the shaft. In the form shown in FIG. 26, a diametrical hole 196 extends trough the shaft 191, and an end portion 198 of the member 192 is positioned in the hole 196. A nut 199 is threaded on the portion 198 to secure the member to the shaft. An enlargement 201 is provided on the member 192 on the side of the shaft 191, which is opposite the nut 199, so that the member 192 may be rigidly secured to shaft 171.

From the foregoing, it will be apparent that a novel and useful means for quickly and easily attaching blades to or detaching blades from a rotatable shaft has been provided. In each of the embodiments of the invention disclosed herein, a blade may be easily attached to a bolt or like member by placing the blade at a certain angular position, which may be referred to as an oriented position, relative to the bolt, and then sliding the blade past a protrusion on to the bolt or member. The protrusion on the bolt then substantially eliminates the chance of accidental detachment of the blades during operation of the mower. When the motor is rotating the shaft at a high speed, the blades extend generally radially outwardly from the shaft but they may not be exactly radially extended from the shaft because there is usually a slight amount of lag due to wind and cutting resistance. It is preferred that the protrusion at the free end portion of the bolt or member be out of alignment with the slot of the opening in the blade during mower operation so that the blade may not easily be accidentally knocked off of the free end of the bolt. When the shaft is not being rotated, the blades hang generally downwardly and there is little tendency for the blades to become accidentally detached from the blade supports.

I claim:

1. In a mower including a generally horizontal rotatable shaft, the improvement of means for attaching blades to said shaft, comprising a plurality of blade support members adapted to be located at axially and angularly spaced locations on said shaft each of said members including a supported end portion which is adapted to be secured to said shaft, a head end portion which is remote from said supported end portion, and a central portion which is located between said supported end and head end portions, said central portion being radially spaced from said shaft, at least one blade mounted on each of said members and having a hole formed therein which is slightly larger than said central portion extending through said hole, said head end portion of each of said members having a protrusion formed thereon, and the hole in each of said blades having an enlargement generally mating with the configuration of but being slightly larger than said protrusion, whereby a blade may be passed over said head end portion when attaching a blade to or detaching a blade from one of said members by positioning said blade such that said enlargement is generally aligned with said protrusion.

2. Apparatus as in claim 1, wherein said protrusion extends generally perpendicularly to a radial line of said shaft.

3. Apparatus as in claim 1, wherein said protrusion extends generally radially of said shaft.

4. Apparatus as in claim 1, wherein said head end portion has two of said protrusions formed thereon, said hole including said enlargement being slightly larger than head end portion including one of said protrusions but smaller than head end portion including said two protrusions, whereby a blade may be attached to said member by hooking said hole over one of said protrusions and tilting said blade to swing said enlargement over the other of said protrusions.

5. Apparatus as in claim 1, wherein said head end portion has two of said protrusions formed thereon, said two protrusions extending from opposite sides of said end portion.

6. Apparatus as in Claim 5, wherein said hole has enlargements of diametrically opposite sides thereof, the total length of said hole including said enlargements being slightly greater than the corresponding dimension of said head end portion including said two protrusions, whereby said blade may be moved past said head end portion by positioning said blade substantially perpendicular to said member with said enlargements aligned with said protrusions.

7. Apparatus as in claim 6, wherein the longitudinal length of said head end portion is substantially greater than the thickness of each of said blades.

8. Apparatus as in claim 5, wherein said two protrusions and said enlargement are rounded and the width thereof is substantially equal to the thickness of said central portion.

9. Apparatus as in claim 5, wherein the width of said enlargement and said two protrusions is substantially less than the thickness of said central portion.

10. Apparatus as in claim 5, wherein said two protrusions are formed by a pin which extends diametrically through said member.

11. Apparatus as in claim 5, wherein the total length of said hole including said enlargement is slightly less than the corresponding dimension of said head end portion including said two protrusions, the dimension of said head end portion lengthwise of said member being sufficiently small that a blade may be attached to said member by hooking said hole on one of said protrusions and swinging said blade to cause said enlargement to pass over the other of said protrusions.

12. Apparatus as in claim 1, wherein said head end portion has only one protrusion formed thereon, and said member is curved such that said central portion is spaced a greater radial distance from said shaft than said head end portion.

13. Apparatus as in claim 12, wherein aid protrusion is formed by pinching outwardly a section of said head end portion.

14. Apparatus as in claim 12, wherein said protrusion is formed on the side of said member which is outermost radially from said shaft.

15. Apparatus as in claim 1, wherein said members include means for securing said member directly to said shaft.

16. Apparatus as in claim 1, and further, including a plurality of ears adapted to be secured to said shaft in radially extending relation, and means for securing said members to said ears.

17. Apparatus as in claim 16, and further, including means on said members and said ears for angularly orienting said protrusions relative to said shaft.

18. Cutting means for a mower including a generally horizontal rotatable shaft and an elongated blade support member secured thereto, said member having one end portion thereof secured to said shaft and a head formed on the other end portion thereof, said cutting means comprising an elongated blade, a cutting edge formed on one end portion of said blade, the other end portion of said blade having a hole formed therein, said hole being elongated in the direction of elongation of said blade and being sized to fit over the head of said support member only when said blade is positioned at a predetermined angle relative to said head.

19. Cutting means as in claim 18, wherein said elongated hole has a keyhole shape.

20. In a mower the improvement comprising a generally horizontal rotatable shaft, a plurality of blade attaching members secured to said shaft at axially and circumferentially spaced locations, and at least one blade attached to each of said members, each of said members being elongated and having one end portion secured to said shaft, each of said members further including a central portion which is radially spaced from said shaft and an outer end portion, said blade having a hole formed therethrough which is larger than the thickness of said central portion, said outer end portion having at least one protrusion formed on a side thereof and said hole having at least one elongation therein which mates with but is larger than said protrusion, whereby said blade may be slipped over said outer end portion when said elongation is aligned with said protrusion.

21. Apparatus as in claim 20, wherein said central portion of said member is substantially circular in cross section, and said outer end portion comprises a head which protrudes radially of and in at least one direction from said circular central section, thus forming said projection.